Figure 1:
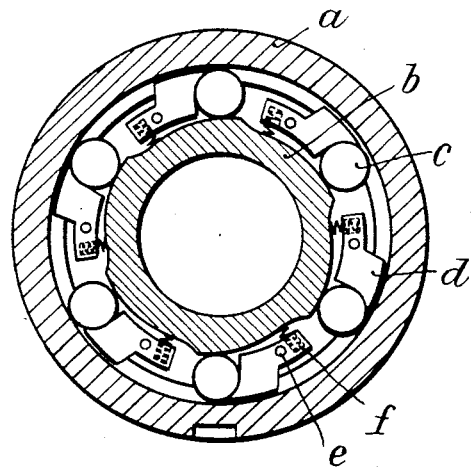

June 16, 1936.  H. BARTHEL  2,044,197
ROLLER CLUTCH
Filed Jan. 7, 1935

H. Barthel
INVENTOR

By Glascock Downing & Seebold
ATYS.

// Patented June 16, 1936

2,044,197

UNITED STATES PATENT OFFICE 2,044,197

ROLLER CLUTCH

Hermann Barthel, Schweinfurt-on-the-Main, Germany

Application January 7, 1935, Serial No. 786
In Germany January 10, 1934

9 Claims. (Cl. 192—45)

There are ratchet reverse locks in which engagement of the ratchet rollers only takes place when both parts are stationary or during slow speeds of rotation, while at high speeds of rotation of the two parts or of the overrunning part engagement is not necessary. In the case of ratchet roller reverse locks of the usual construction, if they are constructed with pressure pieces, which are necessary to ensure certain engagement at every temperature and every consistency of the lubricant, the rollers are continuously pressed against the gripping tracks, so that during overrunning the rollers partly slide and partly roll and thus an exceedingly high frictional resistance is set up. In contradistinction thereto, the roller clutch according to the present invention is fitted with pressure pieces which at high speeds of rotation of the overruning part rise from the rollers. These pressure pieces are constructed as levers with a pivot which are pressed against the rollers by means of springs. On one side of the pivot these levers are overweighted so that as the speed of rotation increases they are raised from the rollers by the centrifugal force against the spring action. By this means the rollers are relieved of load and during free-wheeling no friction between the roller and the rolling track occurs. In this case the eccentric rolling track may be either on the inner ring and the pressure piece is also connected to the inner ring or it may be on the outer ring with which the pressure pieces then also revolve. The arrangement on the outer ring is more satisfactory than that on the inner ring since the rollers in this case, owing to the centrifugal force, are thrown outwardly in the eccentric wedge track and thus no contact with the inner rolling track ring can take place. The condition for ensuring satisfactory operation of the new construction is of course that the part provided with the eccentric track be the overrunning one. Such freewheel devices represent an important technical advance for many fields of application, e. g. for hydraulic gears where rotation has to take place only in one direction while locking must occur in the opposite direction. A very important field of application of the freewheel is the starter of a power-driven vehicle. The starter motor can for instance be provided with a worm. This worm remains continuously in mesh with a worm wheel which through a freewheel clutch according to the present invention drives the motor. A freewheel according to the hitherto known constructions is unsuitable for this purpose since with the high speeds of revolution and the almost continuous overruning condition which exists, rapid wear of the freewheel would take place owing to the friction between the rollers and the gripping track.

Constructional forms of the new construction are illustrated in the drawing.

Figure 2:
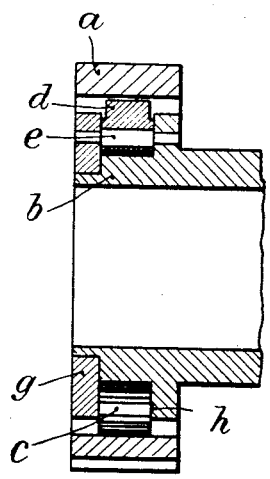

Thus Fig. 1 shows the cross-section and Fig. 2 the longitudinal section of a ratchet roller clutch in which the eccentric clamping track and also the pressure pieces are arranged in the inner ring and in which the freewheeling condition the inner ring is to overrun.

Figure 3:
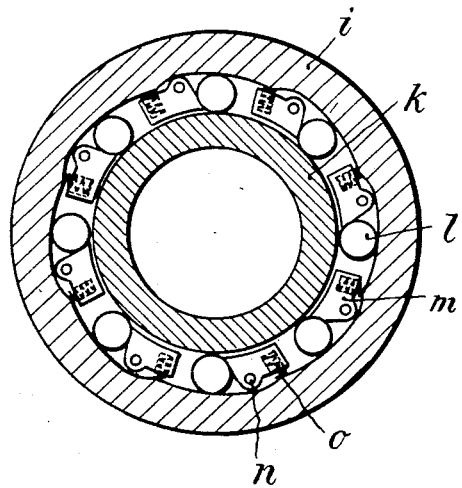
Figure 4:
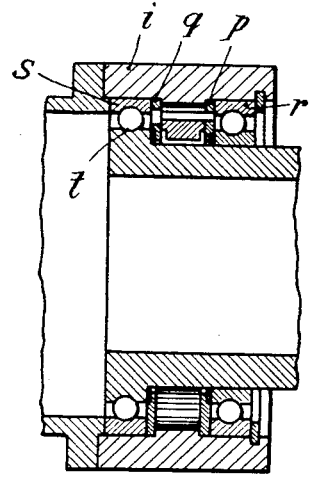

Figs. 3 and 4 show the cross-section and the longitudinal section of a complete ratchet roller clutch with bearings having rolling members, in which the eccentric gripping track lies in the outer ring and the swinging pressure pieces are mounted in the lateral guiding plates of the ratchet rollers.

The outer ring $a$ (Figs. 1 and 2) is for instance connected to the driving shaft, the inner ring $b$ to the driven shaft. If $a$ commences to rotate, then the ratchet roller $c$ in known manner carries the inner ring round with it. In order to ensure certain engagement of all the rollers simultaneously and to avoid the rollers, owing to a lubricant with too high a viscosity or at too low a temperature, not engaging at all, the rollers are pressed upon the gripping track by means of the pressure pieces $d$ which are capable of turning upon pins $e$ and are pressed against the rollers by springs $f$. In order to avoid swerving of the rollers, whereby the rollers would either be overloaded on one side or freewheeling of the clutch would be impossible, curbs $g$ and $h$ are provided laterally of the rollers and between which the rollers lie with a little clearance. If the outer ring $a$ is now decelerated or brought to a standstill, then decoupling of the clutch takes place and the inner ring together with the rollers and pressure pieces run on. Since the pressure pieces are heavier on the side facing the rollers, they rise from the rollers owing to the centrifugal force and counter to the spring action. By this means the friction of the rollers against the fixed or slowly running outer ring is practically equal to zero. This fact is very important, particularly in roller clutches of large dimensions, where in the freewheeling condition, the rollers slide past the stationary ring with very high velocities.

The freewheel device shown in Figs. 3 and 4 attains the effect of complete freedom from friction in the freewheeling condition more fully and when it is constructively possible is to be preferred to the first form. Here the inner ring, e. g. is connected to a worm wheel in which engages the worm of a motor starter. The outer ring is e. g.

connected to the crankshaft of an internal combustion engine. If the parts are stationary and the inner ring $k$ is driven, then it carries the outer ring round with it through the rollers $l$ which are forced under pressure against the wedge surfaces of the outer ring $i$ and thereby carries round with it the crankshaft of the motor. If the inner ring is thereupon stopped, then the outer ring can continue to run alone, e. g. when the starting action has ceased and the motor operates under its own power. If the speed of the outer ring rises, then the pressure pieces $m$, owing to their being heavier on the spring side, are raised from the rollers by centrifugal force against and along the eccentric rolling track outwardly so that any contact between the rollers and inner ring no longer occurs and all wear of the rollers and clamping track is avoided.

Owing to structural reasons it is in many cases important to fit the freewheel with self-contained bearings. These comprise two bearings $r$, $s$, $t$ having rolling members preferably ball bearings and in the present construction take up very little room. The one bearing $s$, $t$ which at the same time takes over the axial location is so constructed that the inner ring $t$ of the bearing is in one piece with the freewheel-inner ring $k$. By this means a holding nut or the like is avoided and the design of the unit appreciably shortened. In addition to this, by this means also the manufacturing costs of the complete freewheel with bearings is considerably reduced.

What I claim is:—

1. A ratchet roller clutch comprising, in combination, a pair of co-operating rotary track members and ratchet rollers interposed between said track members, pressure pieces pivoted on one of the rotary track members for pressing the rollers into operative engagement and springs for urging the pressure pieces into bearing contact with the rollers, said pressure pieces being heavier on one side so that as the speed of revolution increases, the pressure pieces turn on their pivots under the action of centrifugal force against the action of the springs and cease to bear against the ratchet rollers.

2. A ratchet roller clutch comprising, in combination, an inner track ring and outer track ring, one of said track rings having a rolling track and the other a plurality of eccentric wedge tracks, a plurality of ratchet rollers interposed between the track rings, pressure pieces pivoted on one of the track rings for pressing the rollers into operative engagement and springs for urging the pressure pieces into bearing contact with the rollers, said pressure pieces being heavier on one side so that as the speed of revolution increases, the pressure pieces turn on their pivots under the action of centrifugal force against the action of the springs and cease to bear against the ratchet rollers.

3. A ratchet roller clutch comprising, in combination, a pair of co-operating rotary track members and ratchet rollers interposed between said track members, one of said track members being intended for connection to a driving member and the other track member for connection to a driven member to be capable of overrunning the driving member, pressure pieces pivoted on the driven track member for pressing the rollers into operative engagement and springs for urging the pressure pieces into bearing contact with the rollers, said pressure pieces being heavier on one side so that as the speed of revolution increases, the pressure pieces turn on their pivots under the action of centrifugal force against the action of the springs and cease to bear against the ratchet rollers.

4. A ratchet roller clutch comprising, in combination, an inner track ring having a plurality of wedge tracks thereon, an outer track ring having a rolling track thereon, a plurality of ratchet rollers interposed between the track rings, pressure pieces pivoted on the inner track ring for pressing the rollers into operative engagement and springs for urging the pressure pieces into bearing contact with the rollers, said pressure pieces being heavier on one side so that as the speed of revolution increases, the pressure pieces turn on their pivots under the action of centrifugal force against the action of the springs and cease to bear against the ratchet rollers.

5. A ratchet roller clutch comprising, in combination, an inner track ring having a rolling track thereon, an outer track having a plurality of wedge tracks thereon, a plurality of ratchet rollers interposed between the track rings, pressure pieces pivoted on the outer track ring for pressing the rollers into operative engagement and springs for urging the pressure pieces into bearing contact with the rollers, said pressure pieces being heavier on one side so that as the speed of revolution increases, the pressure pieces turn on their pivots under the action of centrifugal force against the action of the springs and cease to bear against the ratchet rollers.

6. A ratchet roller clutch as set forth in claim 2, in which the wedge tracks have cavities and the pressure pieces are mounted in said cavities.

7. A ratchet roller clutch as set forth in claim 2 having plates arranged laterally of the wedge tracks for preventing swerving of the ratchet rollers, the pressure pieces being mounted on said plates.

8. A ratchet roller clutch as set forth in claim 2, having a bearing with rolling members forming a unit with the clutch, said bearing taking over the axial location of the freewheel inner ring with respect to the outer ring.

9. A ratchet roller clutch as set forth in claim 2, having a bearing comprising a pair of race rings and rolling members interposed between the race rings, one of said race rings being in one piece with one of said track rings and adapted to take up axial thrust.

HERMANN BARTHEL.